United States Patent
Orikata (10) Patent No.: US 7,947,890 B2
(45) Date of Patent: May 24, 2011

(54) PROGRAM RECORDING MEDIUM, PLAYBACK DEVICE, AND PLAYBACK CONTROL METHOD

(75) Inventor: Takashi Orikata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 429 days.

(21) Appl. No.: 12/132,827

(22) Filed: Jun. 4, 2008

(65) Prior Publication Data

US 2008/0302232 A1    Dec. 11, 2008

(30) Foreign Application Priority Data

Jun. 6, 2007   (JP) ................................. 2007-149951

(51) Int. Cl.
*G10H 1/00* (2006.01)
*G10H 1/18* (2006.01)
*G10H 7/00* (2006.01)

(52) U.S. Cl. .......................................................... 84/615

(58) Field of Classification Search ................... 84/615, 84/653

See application file for complete search history.

(56) References Cited

U.S. PATENT DOCUMENTS

| | | | |
|---|---|---|---|
| 6,646,966 B2* | 11/2003 | Kajiyama et al. | ............ 369/53.2 |
| 2003/0092492 A1 | 5/2003 | Ishi et al. | |
| 2003/0098864 A1 | 5/2003 | Ohno | |
| 2006/0029025 A1 | 2/2006 | Maehiro | |
| 2006/0069748 A1 | 3/2006 | Sakaguchi et al. | |
| 2006/0153036 A1* | 7/2006 | Tomoda et al. | ............ 369/53.16 |
| 2006/0206478 A1* | 9/2006 | Glaser et al. | ........................ 707/5 |
| 2006/0212444 A1* | 9/2006 | Handman et al. | .................. 707/5 |
| 2007/0106949 A1 | 5/2007 | Narita et al. | |

FOREIGN PATENT DOCUMENTS

JP     2006-40441     2/2006

OTHER PUBLICATIONS

English language Abstract of JP 2006-40441, Feb. 9, 2006.

* cited by examiner

*Primary Examiner* — Jeffrey Donels
(74) *Attorney, Agent, or Firm* — Greenblum & Bernstein, P.L.C.

(57) ABSTRACT

Disclosed is a technology that enables a user to quickly obtain associated information of a music piece to his/her taste while passively hearing music pieces. An initial screen is displayed. A box is displayed at the center of the initial screen, and a character string 'FAVORITE MUSIC PIECE!' is displayed in the box. Next, extracted part of a music piece is randomly selected and played back. Accordingly, a player can passively hear different music pieces in sequence. While part of a music piece is played back, when being satisfied with the music piece, a player touches 'FAVORITE MUSIC PIECE!' with a touch pen. If so, then a detail screen display processing is executed. During the detail screen display processing, the explanation including 'COMPOSER', 'TITLE', and 'PLAYING FORM' of the music piece is displayed.

19 Claims, 9 Drawing Sheets

| COMPOSER ID | COMPOSER NAME | COMPOSER'S DETAILED INFORMATION | COMPOSER IMAGE |
|---|---|---|---|
| 0001 | BEETHOVEN | prof_001 | photo_artist_001 |
| ... | ... | ... | ... |

| MUSIC PIECE ID | SOUND SOURCE DATA (EXTRACT) | SOUND SOURCE DATA (ENTIRE) |
|---|---|---|
| 0001 | music_001_part | music_001_all |
| ... | ... | ... |

| RED | YELLOW | BLUE |
|---|---|---|
| 0001 | 0006 | 0009 |
| 0018 |  | 0021 |
|  |  |  |

PROGRAM RECORDING MEDIUM, PLAYBACK DEVICE, AND PLAYBACK CONTROL METHOD

CROSS REFERENCE TO RELATED APPLICATION

The present disclosure relates to subject matter contained in Japanese Patent Application No. 2007-149951, filed on Jun. 6, 2007, the disclosure of which is expressly incorporated herein by reference in its entirety.

BACKGROUND OF THE INVENTION

1. Field of the Invention

The present invention relates to a program recording medium, a playback device, a playback control program, and a playback control method capable of playing back a music piece and displaying information associated with the music piece.

2. Description of the Related Art

There is known a technology that searches a desired music piece among a plurality of music pieces recorded on a recording medium with the title of the music piece or an artist name as a search keyword and plays back the searched music piece. This technology supposes that a user needs to know the title of the music piece or the artist name and to have an active intention of hearing the music piece.

However, even if there is no knowledge about the music piece or no active intention of hearing the music piece, the user who interests in music is often satisfied with a music piece that he/she has casually and passively heard and wants to obtain information about the music piece.

There is known a technology that enables a user to obtain information about a music piece he/she has passively heard. According to this technology, in the multiple broadcasting, such as digital radio, associated information of the music piece is transmitted with the file of the music piece, and a receiver plays back the music piece and simultaneously displays the associated information (for example, see JP-A-2006-40441). Therefore, the user can obtain information about a music piece to his/her taste while passively hearing the music pieces.

However, according to the foregoing technology, since the broadcasting technologies are used, there is a temporal limit caused by a broadcast time of a program for the user to obtain associated information of a music piece to his/her taste while passively hearing the music pieces. In addition, the playback time of each music piece to be transmitted while the program is broadcast is unspecified, and in many cases, the entire music piece is transmitted. For this reason, the user cannot quickly obtain associated information to his/her taste while passively hearing the music pieces.

SUMMARY OF THE INVENTION

The invention has been finalized in consideration of the drawbacks inherent in the related art, and it is an object of the invention to provide a program recording medium, a playback device, a playback control program, and a playback control method that are capable of enabling a user to obtain associated information of a music piece to his/her taste while passively hearing music pieces.

According to a first aspect of the invention, there is provided a program recording medium that is readable by a computer included in a playback device, which includes a display unit and a playback unit for playing back music sound. The program recording medium includes: a sound source data storage unit that stores sound source data of a plurality of music pieces, which are playable back by the playback unit; and an associated information storage unit that stores associated information associated with each of the plurality of music pieces. The program recording medium has recorded thereon a program which causes the computer to execute the steps of selecting sound source data from the sound source data storage unit and causing the playback unit to play back the sound source data, in a state where a music piece is played back by the playback processing, detecting presence/absence of a given operation, and when the given operation is detected in the step of detecting presence/absence of the given operation, reading out associated information corresponding to the music piece, which is played back by the playback unit, from the associated information storage unit, and causing the display unit to display the read associated information.

Therefore, a user can passively hear music pieces to be played back by the playback unit, and when being satisfied with a music piece he/she had passively heard, he/she performs a given operation. If so, associated information of the music piece is read out and displayed on the display unit. As a result, the user can quickly obtain associated information of a music piece to his/her taste while passively hearing music pieces.

According to a second aspect of the invention, the program recording medium may have recorded thereon a program which causes the computer to execute the steps of, in the step of causing the playback unit to play back the sound source data, randomly and sequentially selecting sound source data from the sound source data storage unit and causing the playback unit to sequentially play back parts of the randomly selected sound source data, and in the step of detecting presence/absence of the given operation, in a state where part of a music piece is played by the step of causing the playback unit to sequentially play back parts of the randomly selected sound source data, detecting presence/absence of the given operation.

Therefore, the user can passively hear parts of music pieces to be randomly played back by the playback unit, and when being satisfied with a music piece, he/she performs a given operation. If so, associated information of the music piece is read out and displayed on the display unit. As a result, the user can quickly obtain associated information of a music piece to his/her taste while passively hearing parts of music pieces.

According to a third aspect of the invention, the sound source data storage unit may store partial sound source data which allows part of each music piece to be playable back on the playback unit. In this case, the program recording medium may have recorded thereon a program which causes the computer to execute the steps of, in the step of causing the playback unit to play back the sound source data, randomly selecting partial sound source data from the sound source data storage unit and causing the playback unit to play back the randomly selected partial sound source data, and in the step of detecting presence/absence of the given operation, in a state where part of a music piece is played by the step of causing the playback unit to play back the randomly selected partial sound source data, detecting presence/absence of the given operation.

Therefore, the user can passively hear parts of music pieces to be randomly played back by the playback unit, and when being satisfied with a music piece, he/she performs a given operation. If so, associated information of the music piece is read out and displayed on the display unit. As a result, the user can quickly obtain associated information of a music piece to his/her taste while passively hearing parts of music pieces.

In addition, since partial sound source data for enabling part of each music piece to be played back is stored, sound source data of many music pieces can be efficiently stored.

According to a fourth aspect of the invention, the program recording medium may further include an entire sound source data storage unit that, for each music piece corresponding to the partial sound source data stored in the partial sound source data storage unit, stores entire sound source data for playing back the entire music piece.

Therefore, the entire music piece can be played back as occasion demands.

According to a fifth aspect of the invention, the associated information stored in the associated information storage unit may include at least a title of a music piece, explanation data of the music piece, and an associated image.

Therefore, at least the title of the music piece, the explanation data of the music piece, and the associated image are displayed as the associated information.

According to a sixth aspect of the invention, the associated information storage unit may store a plurality of kinds of associated information associated with each music piece. In this case, the step of causing the display unit to display the associated information may include a plurality of substeps. The program recording medium causes the computer to execute the substeps of, when the given operation is detected by the step of detecting presence/absence of the given operation, reading out first associated information from the associated information storage unit and causing the display unit to display the first associated information, and after the step of causing the display unit to display the first associated information, in response to an operation, sequentially reading out additional associated information from the associated information storage unit and causing the display unit to display the additional associated information.

Therefore, if the user performs an operation, detailed information about the music piece is sequentially displayed.

According to a seventh aspect of the invention, the plurality of kinds of associated information may include information indicative of an additional recording medium on which a corresponding music piece is recorded.

Therefore, the user easily gets other recording mediums recorded thereon the music piece, such as CD.

According to an eighth aspect of the invention, the program recording medium may further include a writable storage area. In this case, the program recording medium may have recorded thereon a program which causes the computer to execute a step of writing music piece information indicative of a music piece, which is played back when the given operation is made, into the storage area according to a write request based on an operation.

Therefore, the user can register music piece information indicative of the music piece to his/her taste while passively hearing music pieces.

According to a ninth aspect of the invention, the program recording medium may have recorded thereon a program which causes the computer to execute the steps of selecting one from the music piece information written into the storage area by the step of writing the music piece information according to an operation, and reading out entire sound source data of a music piece identified by the music piece information selected by the step of selecting the music piece information from the entire sound source data storage unit and causing the playback unit to play back the read entire sound source data.

Therefore, when the user has registered music piece information indicative of a music piece to his/her taste while passively hearing music pieces, he/she can instantly hear the entire music piece in future.

According to a tenth aspect of the invention, the program recording medium may be a semiconductor memory.

According to an eleventh aspect of the invention, the program recording medium may be a recording medium exclusively for a portable video game machine.

According to a twelfth aspect of the invention, a playback device includes: a display unit; a playback unit that plays back music sound; a sound source data storage unit that stores sound source data of a plurality of music pieces, which are playable back by the playback unit; an associated information storage unit that stores associated information associated with each of the plurality of music pieces; a playback processing unit that selects sound source data from the sound source data storage unit and causes the playback unit to play back the sound source data; a detection unit that, in a state where a music piece is played back by the playback processing unit, detects presence/absence of a given operation; and a display processing unit that, when the given operation is detected by the detection unit, reads out associated information corresponding to the music piece, which is played back by the playback unit, from the associated information storage unit and causes the display unit to display the read associated information.

Therefore, the playback device has the same advantages and effects as the first aspect of the invention.

According to a thirteenth aspect of the invention, there is provided a playback control program. A device includes a display unit, a playback unit that plays back music sound, a sound source data storage unit that stores sound source data of a plurality of music pieces, which are playable back by the playback unit, and an associated information storage unit that stores associated information associated with each of the plurality of music pieces. The playback control program causes a computer included in the device to execute the steps of: selecting sound source data from the sound source data storage unit and causing the playback unit to play back the sound source data, in a state where a music piece is played back by the playback processing, detecting presence/absence of a given operation, and when the given operation is detected in the step of detecting presence/absence of the given operation, reading out associated information corresponding to the music piece, which is played back by the playback unit, from the associated information storage unit, and causing the display unit to display the read associated information.

Therefore, when the computer operates according to the program, the same advantages and effects as the first aspect of the invention can be obtained. As a result, the playback technique of the invention can be easily implemented by hardware, such as a general-use computer or a general-use game apparatus.

According to a fourteenth aspect of the invention, there is provided a playback control method of a playback device. The playback device includes a display unit, a playback unit that plays back music sound, a sound source data storage unit that stores sound source data of a plurality of music pieces, which are playable back by the playback unit, and an associated information storage unit that stores associated information associated with each of the plurality of music pieces. The playback control method includes selecting sound source data from the sound source data storage unit and causing the playback unit to display the selected sound source data; in a state where a music piece is played back by causing the playback unit to display the sound source data, detecting presence/absence of a given operation; and when the given operation is detected by detecting presence/absence of the given operation, reading out associated information corresponding to the music piece, which is played by the playback unit, from the associated information storage unit and causing the display unit to display the read associated information.

Therefore, when a computer executes processing according to the steps, the same advantages and effects as the first aspect of the invention can be obtained.

According to the invention, the user can quickly obtain associated information of a music piece to his/her taste while passively hearing music pieces.

DETAILED DESCRIPTION OF THE INVENTION

Figure 1:
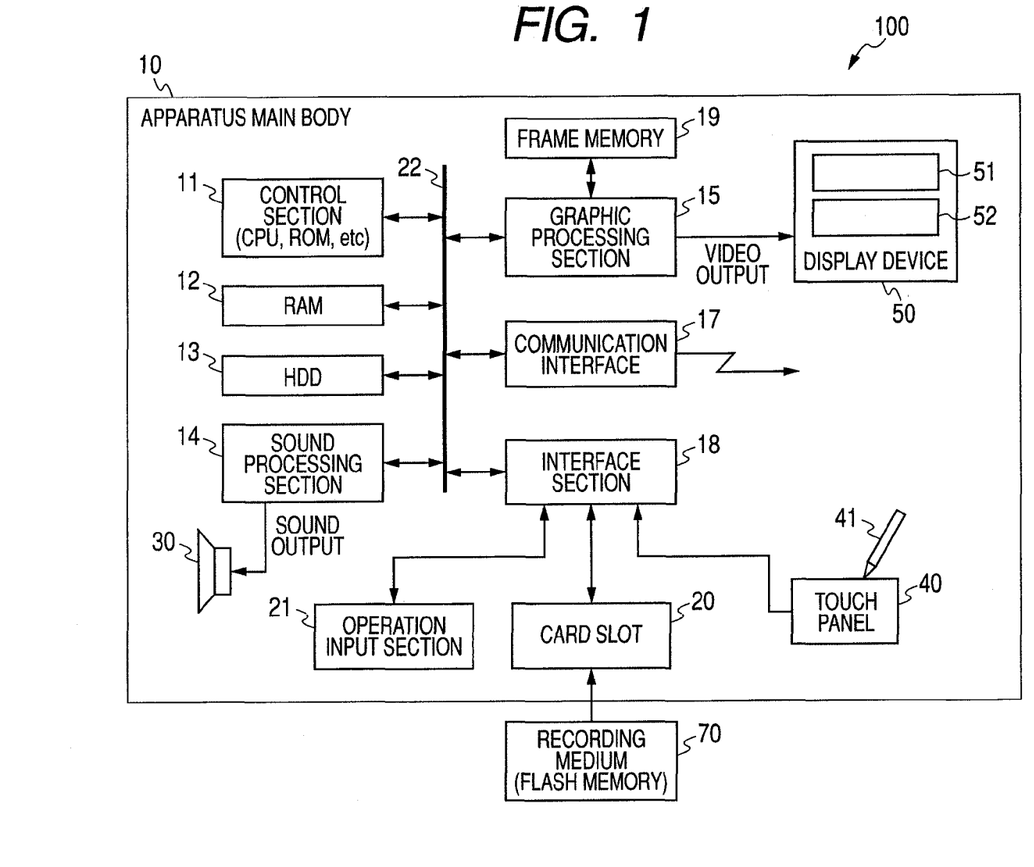
FIG. 1 is a block diagram showing the construction of a video game apparatus according to an exemplary embodiment of the invention.

An exemplary embodiment of the invention will now be described with reference to the drawings. FIG. 1 is a block diagram showing the construction of a video game apparatus 100 according to an exemplary embodiment of the invention. The video game apparatus 100 includes a portable apparatus main body 10, on which individual units are mounted.

On the surface of the apparatus main body 10, a display device 50 and an operation input section 21 are provided. The display device 50 has a plurality of image display sections, for example, an upper image display section 51 and a lower image display section 52. The operation input section 21 is constituted from a power supply switch, and switches and keys, such as a cross key or other keys.

A circuit provided in the apparatus main body 10 includes a control section 11, a RAM (Random Access Memory) 12, a hard disc drive (HDD) 13, a sound processing section 14, a graphic processing section 15, a communication interface 17, an interface section 18, a frame memory 19, and a card slot 20. The control section 11, the RAM 12, the HDD 13, the sound processing section 14, the graphic processing section 15, the communication interface 17, and the interface section 18 are connected to an internal bus 22.

The control section 11 includes a CPU (Central Processing Unit), a ROM (Read Only Memory), and the like, and controls the entire video game apparatus 100 according to control programs stored in the HDD 13 or a recording medium 70. The control section 11 includes an internal timer that is used to generate timer interruption. The RAM 12 is also used as a work area for the control section 11.

The sound processing section 14 serves as a sound input/output interface that performs D/A conversion and A/D conversion on sound signals. The sound processing section 14 is connected to a sound output device 30, which includes a speaker. The sound processing section 14 outputs sound signals to the sound output device 30 according to a sound output instruction from the control section 11, which is executing a processing according to various control programs.

The graphic processing section 15 is connected to the display device 50 that has the upper image display section 51 and the lower image display section 52. The graphic processing section 15 develops images to the frame memory 19 according to a drawing instruction from the control section 11, and simultaneously outputs video signals to the display device 50 such that the upper and lower image display sections 51 and 52 display images. A switching time for the images to be displayed according to the video signals is set to, for example, 1/30 second per frame.

A recording medium 70, in which programs and the like are stored, is installed in the card slot 20. In this embodiment, the recording medium 70 is a semiconductor memory, such as a writable flash memory or the like. The communication interface 17 is connectable to another video game apparatus 100 in a wireless or wired manner, and simultaneously connectable to a communication network, such as Internet or the like, in a wireless or wired manner. The vide game apparatus main body 10 can perform communication with another video game apparatus 100 by means of a communication function of the communication interface 17.

The operation input section 21, the card slot 20, and a touch panel 40 are connected to the interface section 18. The interface section 18 causes the RAM 12 to store instruction data from the operation input section 21 based on an operation by a player (user) and instruction data based on an operation on the touch panel 40 with a touch pen 41 by the player. In response to the instruction data stored in the RAM 12, the control section 11 executes various arithmetic processing.

The touch panel 40 may be stacked on display screens of both the upper and lower image display sections 51 and 52, or a display screen of at least one of the upper and lower image display sections 51 and 52. In this case, by managing and controlling a display timing of one of the upper and lower image display sections 51 and 52, on which the touch panel 40 is stacked, and an operation timing with the touch pen 41 on the touch panel 40 and the coordinates of a position where the touch pen 41 touches, the control unit 11 recognizes input information according to operation input by input operation by the player. Moreover, the display device 50 may constitute a display screen from a single image display section, instead of having a plurality of image display sections, such as the upper and lower image display sections 51 and 52.

The interface section 18 performs, according to the instructions from the control section 11, a processing to store data indicative of the progress of a game stored in the RAM 12 into the recording medium 70 installed in the card slot 20. The interface section 18 also performs a processing to read out data on the game when suspended stored in the recording medium 70 and to transmit such data to the RAM 12.

Various kinds of data, such as the control programs for performing the game with the video game apparatus 100, are stored in the recording medium 70. Various kinds of data, such as the control programs, stored in the recording medium 70 are read out by the control section 11 via the card slot 20, in which the recording medium 70 is installed, and loaded onto the RAM 12.

The control section 11 executes, according to the control programs loaded onto the RAM 12, various kinds of processing, such as a processing to output a drawing command to the graphic processing section 15, a processing to output a sound output command to the sound processing section 14, and the like. Moreover, while the control section 11 executes the processing, interim data generated according to the progress of the game is stored in the RAM 12 used as a work memory.

Figure 2:
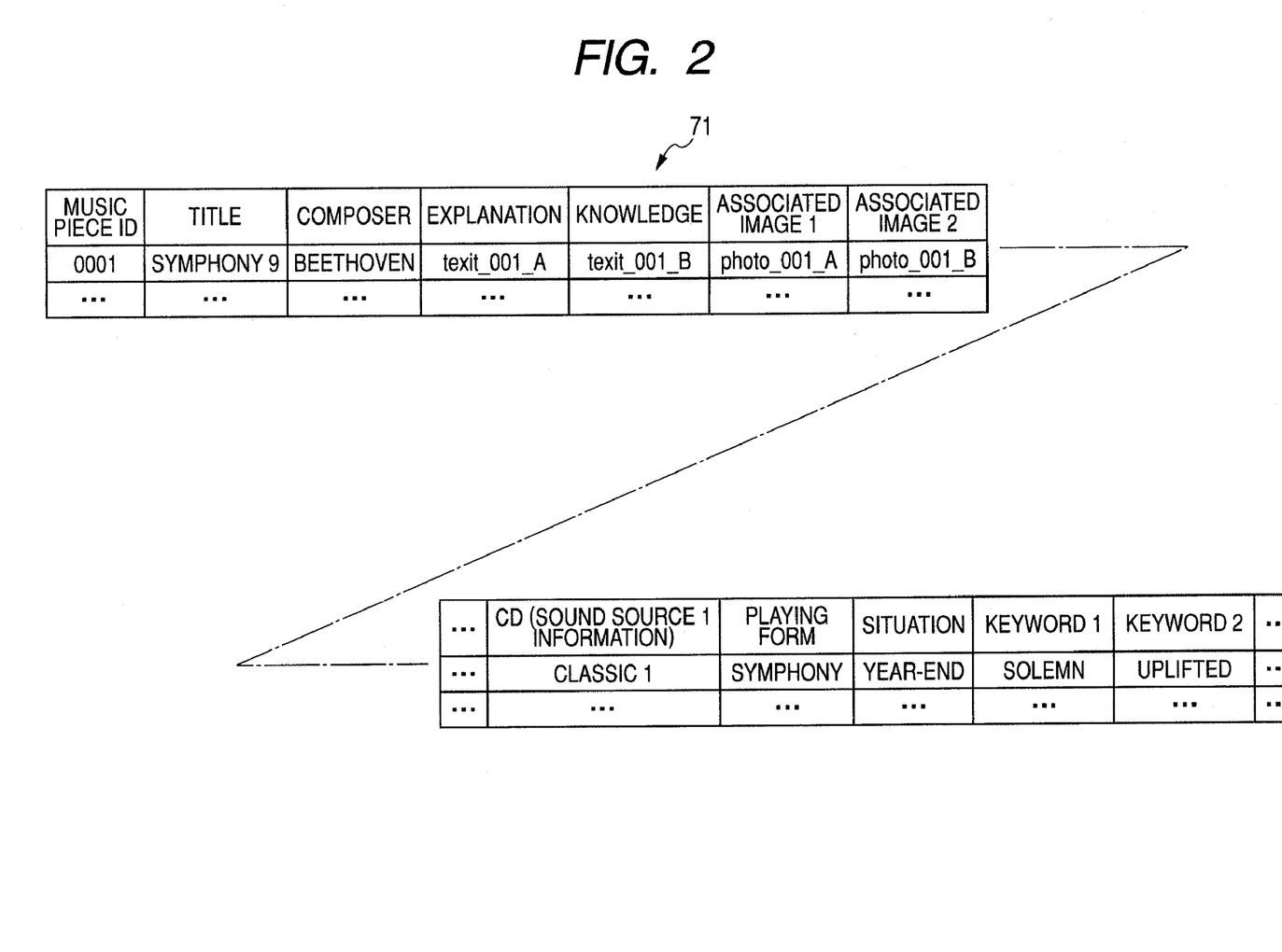
FIG. 2 is a schematic view showing a music piece data table.
Figure 3A:
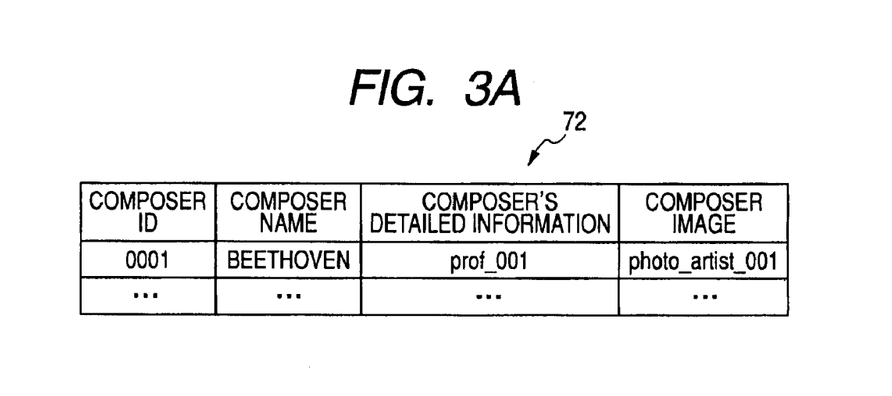
FIG. 3A is a schematic view showing a composer data table.
Figure 3B:
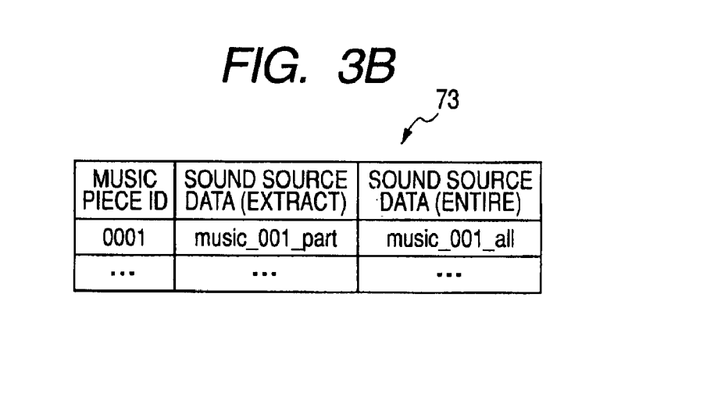
FIG. 3B is a schematic view showing a sound source data table.
Figure 3C:
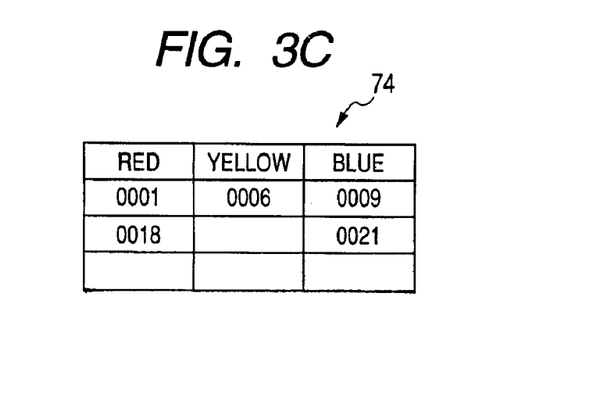
FIG. 3C is a schematic view showing a favorite registration table.

The recording medium 70 stores a program for executing processing shown in flowcharts described below, a music piece data table 71 shown in FIG. 2, a composer data table 72 shown in FIG. 3A, a sound source data table 73 shown in FIG. 3B, and a favorite registration table 74 shown in FIG. 3C.

The music piece data table 71 stores, in correspondence with a music piece ID unique to each music piece, 'TITLE', 'COMPOSER', 'EXPLANATION', 'KNOWLEDGE', 'ASSOCIATED IMAGE 1', 'ASSOCIATED IMAGE 2', . . . , 'CD (SOUND SOURCE) INFORMATION', 'PLAYING FORM', 'SITUATION', 'KEYWORD 1', 'KEYWORD 2', . . . 'TITLE' is the title of the music piece corresponding to the music piece ID, and 'COMPOSER' is the composer of the music piece. 'EXPLANATION' is the explanation of the music piece, 'KNOWLEDGE' is the comment or the episode about the music piece or the composer, and 'ASSOCIATED IMAGE 1', 'ASSOCIATED IMAGE 2', . . . are a plurality of images associated with the music piece, excluding 'COMPOSER IMAGE' described below.

'CD (SOUND SOURCE) INFORMATION' is information about a title, distributor, and price of a CD on which the music piece is recorded, and a CD image, that is, an image of a case having accommodated therein, and 'PLAYING FORM' is information about the playing form of the music piece, such as 'SYMPHONY'. 'SITUATION' is information indicative of when or in which scene a user is recommended to hear the music piece. The same situation may be stored in correspondence with different music pieces. 'KEYWORD 1', 'KEYWORD 2', . . . are words for clearly representing the music piece and used to search the music piece. In respects to 'KEYWORD 1', 'KEYWORD 2', . . . , the same keyword may be stored for difference music pieces.

The composer data table 72 stores, in correspondence with a composer ID unique to each composer, 'NAME', 'DETAILED INFORMATION', and 'IMAGE'. 'NAME' is the name of a composer corresponding to a composer ID, 'DETAILED INFORMATION' is the profile of the composer, and 'IMAGE' is image data that can clearly display the face of the composer.

The sound source data table 73 stores, in correspondence with the 'MUSIC PIECE ID', 'SOUND SOURCE DATA (EXTRACT)', and 'SOUND SOURCE DATA (ENTIRE)'. 'SOUND SOURCE DATA (EXTRACT)' is the most famous part of the music piece, for example, the refrain of the music piece. Such data may be played back for 15 seconds. 'SOUND SOURCE DATA (ENTIRE)' is data for playing back the entire music piece. In this embodiment, 'SOUND SOURCE DATA (EXTRACT)' is the 'REFRAIN' part, but it may be an 'INTRO' part at the start of the music piece.

The favorite registration table 74 stores 'MUSIC PIECE ID' of music pieces selected by the player according to 'RED', 'YELLOW', and 'BLUE'. Here, 'RED', 'YELLOW', and 'BLUE' are image colors of the music pieces selected by the player. For example, 'RED' may represent intense music, and 'BLUE' may represent soft music. Alternatively, 'RED', 'YELLOW', and 'BLUE' may be divided based on 'DEGREE OF FAVORITE'. Of course, 'RED', 'BLUE', and 'YELLOW' are just an example. For example, numbers, such as '1', '2', and '3', may be used, or 'RELAX', 'DRIVE', or 'DINNER' may be used. Moreover, three kinds of registration destinations of 'RED', 'YELLOW', and 'BLUE' are illustrated, but two or more kinds of registration destinations may be used.

Next, a processing procedure in this embodiment will be described with reference to the flowcharts shown in FIG. 4 and later figures. Moreover, the following processing is executed when the control section 11 controls other constituent elements in the video game apparatus based on a game program stored in the recording medium 70.

Figure 4:
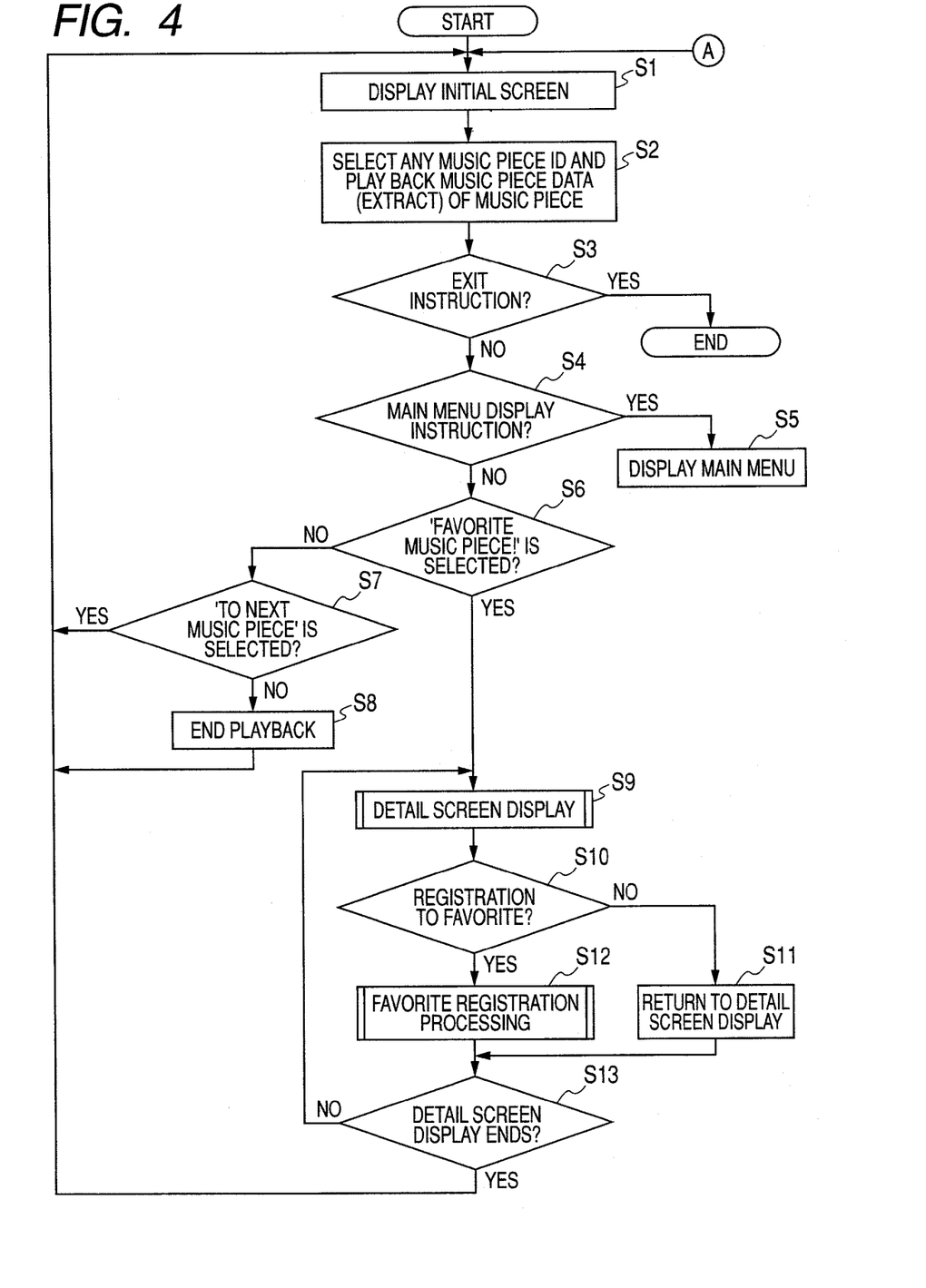
FIG. 4 is a flowchart illustrating a processing procedure of this embodiment.
Figure 9A:
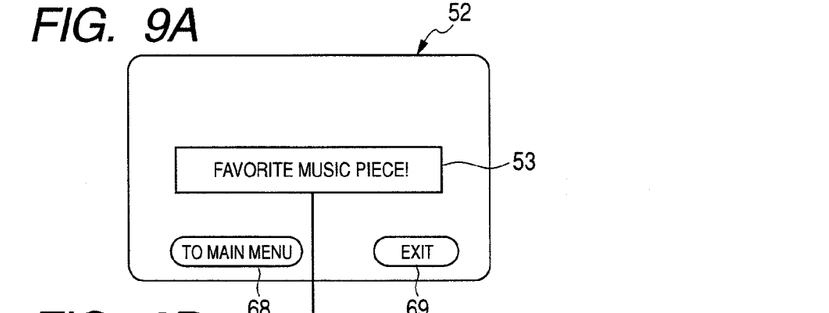
FIGS. 9A to 9D are display transition diagrams.

FIG. 4 is a flowchart showing the overall processing procedure. That is, if the power supply switch is operated, a music piece is automatically selected from the sound source data table 73 in a random manner and starts to be played back, and the control section 11 executes an initial screen display processing to cause the lower image display section 52 to display an initial screen (Step S1). As shown in FIG. 9A, a box 53 is displayed at the center of the initial screen, and a character string 'FAVORITE MUSIC PIECE!' is displayed in the box 53. Further, a 'TO MAIN MENU' button 68 and an 'EXIT' button 69 are displayed. That is, even if a screen, such as 'MENU SCREEN', is not displayed or the player does not perform an operation to play back a music piece, music starts to be played back when power is supplied.

Unless the 'TO MAIN MENU' button 68 or the 'EXIT' button 69 shown in FIG. 9A is selected, a music piece ID is selected, and music piece data (extract) of the music piece is played back (Step S2).

In Step S2, when selecting a music piece ID, the 'MUSIC PIECE ID' of a music piece which is not played back yet when the power supply switch is turned on is selected from the sound source data table 73 in a random manner. Accordingly, after the power supply switch is turned on, there is no case where a music piece which was previously played back is selected again or the same music piece is successively selected, and all the music pieces are selected once. Moreover, if all the music pieces are selected once, similarly, the 'MUSIC PIECE ID' of a music piece which is not played back yet is selected from the sound source data table 73 in a random manner. Then, 'SOUND SOURCE DATA (EXTRACT)' corresponding to the 'MUSIC PIECE ID' selected in a random manner is read out from the sound source data table 73 and played back.

Accordingly, music sound constituting the music piece identified by the music piece ID is output from the sound output device 30.

Next, it is determined whether or not an exit instruction is input by pen-touching of the 'EXIT' button 69 (Step S3). When the exit instruction is input, the process progresses to 'END', and the processing based on the flowchart ends. When the exit instruction is not input, it is determined whether or not a main menu display instruction is input by pen-touching of the 'TO MAIN MENU' button 68 (Step S4). When the main menu display instruction is not input, it is determined whether or not the character string 'FAVORITE MUSIC PIECE!' in the box 53 is selected by pen-touching (Step S6). When 'FAVORITE MUSIC PIECE!' is not selected, it is determined whether or not 'TO NEXT MUSIC' is selected by key operation (Step S7). When any one of 'FAVORITE MUSIC PIECE!' and 'TO NEXT MUSIC' is not selected, that is, when it is determined NO in Steps S6 and S7, after the music piece data (extract) is played back (for 15 seconds), the playback of the music piece data ends, (Step S8), and the process returns to Step S1.

If the player does not perform any operation, it is determined NO in Steps S3, S4, S6, and S7, and after the music piece data (extract) is played back (for 15 seconds), the playback of the music piece data ends (Step S8), next music piece data (extract) starts to be played back (Step S2). Therefore, each time 15 seconds elapse, parts of music pieces are randomly played back for every 15 seconds, and thus the player can passively and sequentially hear different music pieces.

While a part of a music piece is played back, if the player is not satisfied with the music piece, he/she instructs to stop the playback of the music piece, which is currently played back, and to play back a different music piece by key operation of 'HEAR NEXT MUSIC' or the like. If so, it is determined YES in Step S7, even if a music piece is played back for 15 seconds, the process returns to Step S1, and a randomly selected next music piece starts to be played back.

In a state where a music piece is played back, if the player is satisfied with the music piece and wants to obtain detailed information about the music piece, he/she touches the character string 'FAVORITE MUSIC PIECE!' in the box 53 with the touch pen 41. If so, it is determined YES in Step S6. Accordingly, the process progresses to Step S9 from Step S6, and a detail screen display processing described below is executed.

While music pieces are randomly played back, if the player stops the random playback of the music pieces and wants to hear a music piece which is registered as a favorite music piece, he/she touches the 'TO MAIN MENU' button 68 shown in FIG. 9A with the touch pen 41. If so, it is determined YES in Step S4. Then, the process progresses to Step S5 from Step S4, and the main menu is displayed. Though not shown, the main menu has, for example, 'SEARCH MUSIC PIECE' or a menu for playing back a music piece selected by the player from the music pieces registered optionally by the player as 'FAVORITE'. Therefore, the player himself/herself can select and hear a music piece.

Meanwhile, when detail screen display is executed in Step S9, if 'FAVORITE' is selected, it is determined YES in Step S10. Accordingly, the process progresses to Step S12 from Step S10, and as described below, the music piece can be registered in 'FAVORITE' (Step S12). If 'FAVORITE' is not selected, and it is determined NO in Step S10, the process returns to the detail screen display processing (Step S11). Then, it is determined whether or not a detail screen display exit instruction is input (Step S13). When the detail screen display exit instruction is input and it is determined YES in Step S13, the process returns to the initial screen display in Step S1 from the detail screen display in Step S9.

Figure 5:
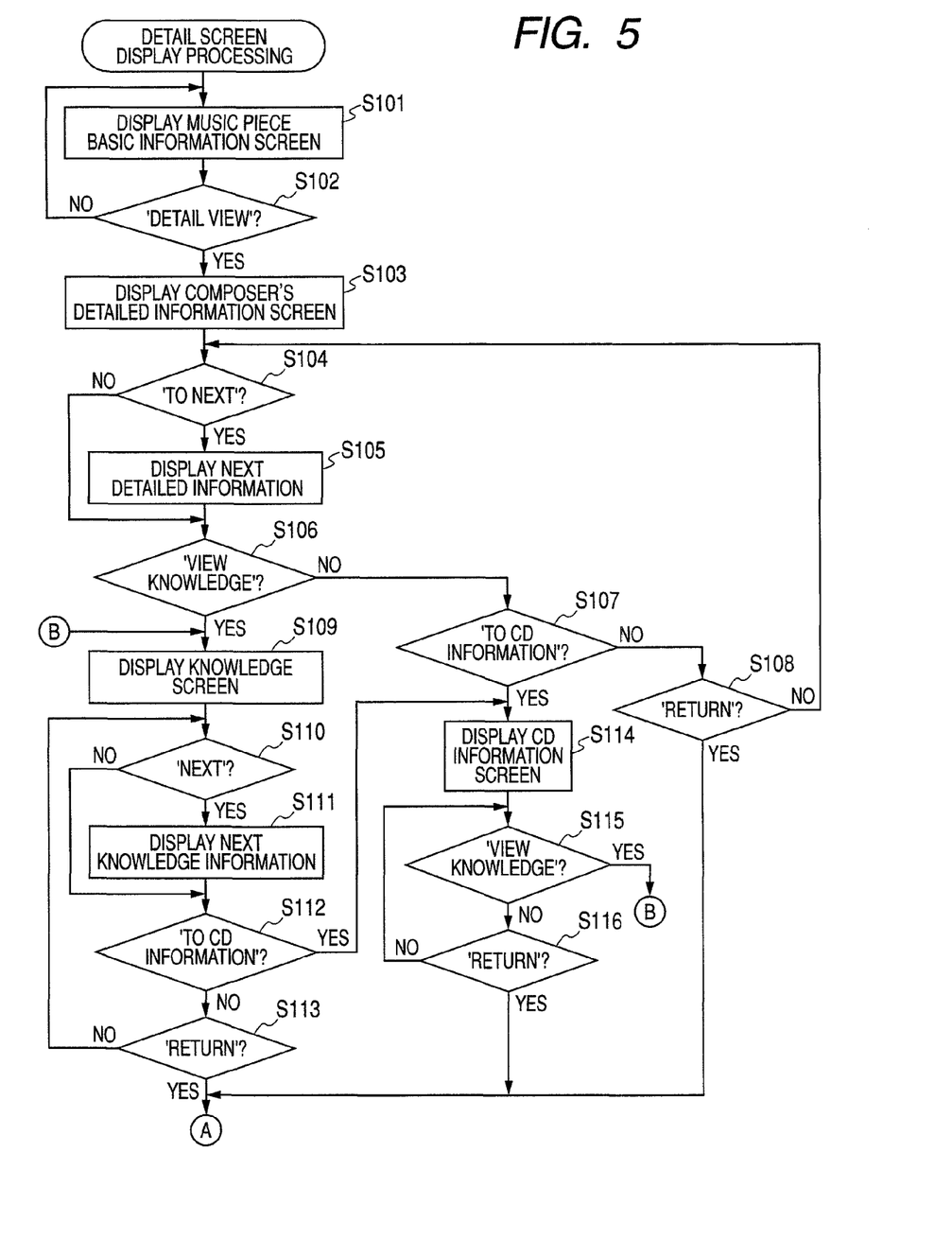
FIG. 5 is a flowchart illustrating the details of a detail screen display processing.
Figure 9B:
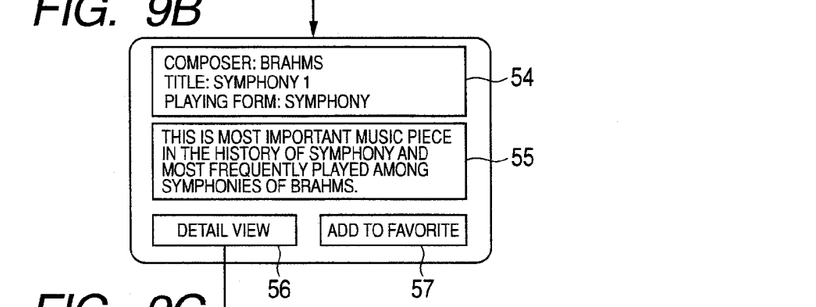

FIG. 5 is a flowchart showing a procedure of the detail screen display processing (Step S9). First, a music piece basic information screen is displayed (Step S101). The music piece information screen is as shown in FIG. 9B. On the music piece information screen, a first window 54 and a second window 55 are displayed up and down, and a 'DETAIL VIEW' button 56 and an 'ADD TO FAVORITE' button 57 are displayed therebelow. Then, when it is determined YES in Step S6, that is, when the player touches the character string 'FAVORITE MUSIC PIECE!' in the box 53 with the touch pen 41, 'COMPOSER', 'TITLE', and 'PLAYING FORM' corresponding to the ID of a music piece, which is being played back, are read out from the music piece data table 71 and displayed on the first window 54. Further, the explanation corresponding to the ID of a music piece, which is being played back, is read out from the music piece data table 71 and displayed on the second window 55.

Accordingly, if the player touches the character string 'FAVORITE MUSIC PIECE!' in the box 53 with the touch pen 41, the display screen shown in FIG. 9A is changed to the display screen shown in FIG. 9B. Then, as shown in FIG. 9B, 'COMPOSER: BRAHMS, TITLE: SYMPHONY 1, PLAYING FORM: SYMPHONY' and 'THIS IS MOST IMPORTANT MUSIC PIECE IN THE HISTORY OF SYMPHONY . . . ' are displayed. Therefore, the player can passively hear music pieces which are randomly played back, and when there is a music piece to his/her taste, can quickly obtain associated information of the music piece to his/her taste.

Figure 9C:
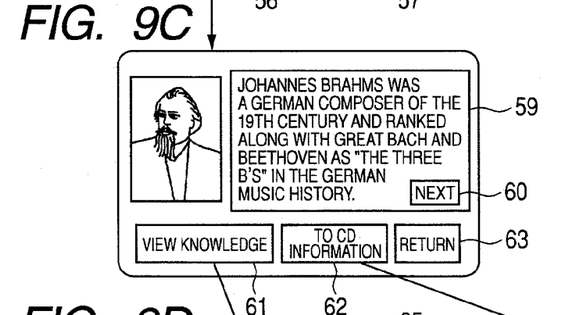

On the display screen shown in FIG. 9B, it is determined whether or not the 'DETAIL VIEW' button 56 is pen-touched (Step S102). When the 'DETAIL VIEW' button 56 is pen-touched, a composer's detailed information screen is displayed (Step S103). The composer's detailed information screen is as shown in FIG. 9C. On the composer's detailed information screen, a composer image 58 and a third window 59 are displayed, a 'NEXT' button 60 is displayed in the third window 59, and a 'VIEW KNOWLEDGE' button 61, a 'TO CD INFORMATION' button 62, and a 'RETURN' button 63 are displayed therebelow. In this case, for the composer image 58, a composer image corresponding to the composer displayed in the first window 54 is read out from the composer data table 72 and displayed. Further, in the third window 59, 'COMPOSER'S DETAILED INFORMATION' corresponding to the composer is read out from the composer data table 72 and displayed.

If the player touches the 'DETAIL VIEW' button 56 with touch pen 41, the display screen shown in FIG. 9B is changed to the display screen shown in FIG. 9C. Accordingly, as shown in FIG. 9C, an image 'BRAHMS' is displayed as the composer image 58, and the explanation of the composer, that is, 'YOHANNES BRAHMS . . . ' is displayed. Therefore, the player can quickly obtain detailed information of a composer, who composes a music piece to his/her taste, while passively hearing music pieces.

On the display screen shown in FIG. 9C, it is determined whether or not the 'NEXT' button 60 is pen-touched (Step S104). When the 'NEXT' button 60 is pen-touched, next 'composer's detailed information' is read out from the composer data table 72 and displayed in the third window 59 (Step S105). That is, character information is stored in the 'composer's detailed information' of the composer data table 72 based on the number of characters to be displayable in the third window 59, and each time the 'NEXT' button 60 is pen-touched, next character information is read out and displayed in the third window 59.

Further, it is determined whether or not 'VIEW KNOWLEDGE' button 61 shown in FIG. 9C is pen-touched (Step S106), whether or not the 'TO CD INFORMATION' button 62 is pen-touched (Step S107), and whether or not the 'RETURN' button 63 is pen-touched (Step S108). When no button is pen-touched, the process returns to Step S104. Accordingly, when any one of the 'VIEW KNOWLEDGE' button, the 'TO CD INFORMATION' button, and the 'RETURN' button is not touched, the loop of Steps S104 to S108 is repeatedly performed.

If the player views the composer's detailed information screen shown in FIG. 9C, interests in the music piece, and pen-touches the 'VIEW KNOWLEDGE' button 61 to obtain knowledge about the music piece, it is determined YES in Step S106. Then, the process progresses to Step S109 from Step S106, and a knowledge screen is displayed.

Figure 9D:
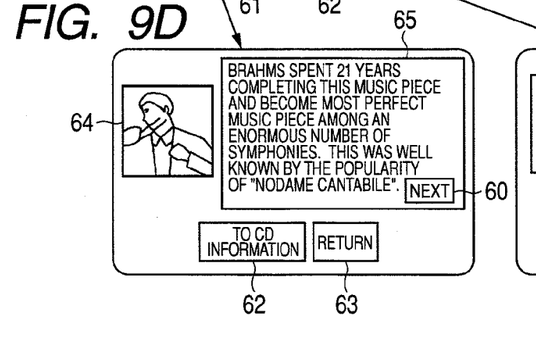

The knowledge screen is as shown in FIG. 9D. On the knowledge screen, an associated image 64 and a fourth window 65 are displayed, a 'NEXT' button 60 is displayed in the fourth window 65, and a 'TO CD INFORMATION' button 62 and a 'RETURN' button 63 are displayed therebelow. In this case, for the associated image 64, 'ASSOCIATED IMAGE 1' corresponding to the title of the music piece displayed in the first window 54 is read out from the music piece data table 71 and displayed. In addition, in the fourth window 65, 'KNOWLEDGE' corresponding to the title of the music piece is read out from the music piece data table 71 and displayed.

If the player touches the 'VIEW KNOWLEDGE' button 61 with the touch pen 41, the display screen shown in FIG. 9C is changed to the display screen shown in FIG. 9D. Then, as shown in FIG. 9D, an image of a conductor who directs the music piece is displayed as the associated image 64 and an episode of the music piece, 'BRAHMS SPENT 21 YEARS COMPLETING THIS MUSIC PIECE . . . ' and the detailed explanation of the compose. Therefore, the player can obtain quickly information, such as detailed explanation and episode about a music piece to his/her taste or a composer, while passively hearing music pieces.

On the display screen shown in FIG. 9D, it is determined whether or not the 'NEXT' button 60 is pen-touched (Step S110). When the 'NEXT' button 60 is pen-touched, next 'KNOWLEDGE' is read out from the music piece data table 71 and displayed in the fourth window 65, and 'ASSOCIATED IMAGE 2' is read out from the music piece data table 71 and replaced for the associated image 64 (Step S111). That is, as described above, knowledge information is stored in 'KNOWLEDGE' corresponding to each music piece of the music piece data table 71 based on the number of characters to be displayable in the fourth window 65, and each time the 'NEXT' button 60 is pen-touched, next character information is read out and displayed in the fourth window 65. In addition, since the music piece data table 71 stores a plurality of associated images, for example, 'ASSOCIATED IMAGE 1', 'ASSOCIATED IMAGE 2', . . . , each time the 'NEXT' button 60 is touched, a next associated image is replaced for the associated image 64.

It is determined whether the 'TO CD INFORMATION' button 62 shown in FIG. 9D is pen-touched (Step S112). In this case, when the player views 'KNOWLEDGE', interests in the music piece, and wants to purchase a CD, he/she pen-touches the 'TO CD INFORMATION' button 62. If so, it is determined YES in Step S112, and the process progresses to Step S114 from Step S112.

Meanwhile, when the player views the composer's detailed information screen shown in FIG. 9C, not 'KNOWLEDGE', interests in the music piece, and wants to purchase the CD, on the display screen shown in FIG. 9C, the player pen-touches the 'TO CD INFORMATION' button 62. If so, while the loop of Steps S104 to S108 is repeatedly performed, it is determined YES in Step S107. Then, the process progresses to Step S114 from Step S107, and a CD information screen is displayed.

Figure 9E:
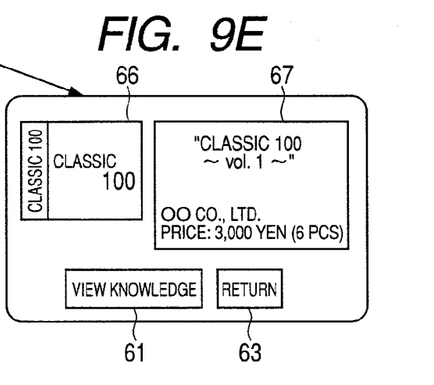

The CD information screen is as shown in FIG. 9E. On the CD information screen, a CD image 66 and a fifth window 67 are displayed, and the 'VIEW KNOWLEDGE' button 61 and the 'RETURN' button 63 are displayed therebelow. For the CD image 66, 'CD (SOUND SOURCE) INFORMATION' corresponding to the title of the music piece displayed in the first window 54 is read out from the music piece data table 71, and the CD image 66 which is an image of a case having accommodated therein the CD included in 'CD (SOUND SOURCE) INFORMATION' is displayed. Further, in the fifth window 67, the title, the distributor, and the price of the CD having recorded thereon the music piece included in 'CD (SOUND SOURCE) INFORMATION' are displayed.

On the display screen shown in FIG. 9C, when the player touches the 'TO CD INFORMATION' button 62 with the touch pen 41, the display screen shown in FIG. 9C is changed to the display screen shown in FIG. 9E. Then, as shown in FIG. 9E, the CD image 66, which is the image of the case having accommodated therein the CD, the title, the price, and the like are displayed. Therefore, the player can quickly obtain information about a CD having recorded thereon a music piece that he/she wants to purchase, without viewing 'KNOWLEDGE'.

As described above, when the player who views 'KNOWLEDGE' interests in the music piece and pen-touches 'TO CD INFORMATION' button 62 to purchase the CD, the process progresses to Step S114 from the Step S112 and the CD information is displayed. Therefore, when the player wants to purchase the CD after viewing 'KNOWLEDGE', he/she can quickly obtain information about the CD having recorded thereon the music piece.

Moreover, if the player pen-touches the 'RETURN' button 63 on any display screen, it is determined YES in any of Steps S108, S113, and S116. Then, the process returns to Step S1 shown in FIG. 4 from one of Steps S108, S113, and S116, in which it is determined YES, and the above-described random playback restarts.

Figure 6:
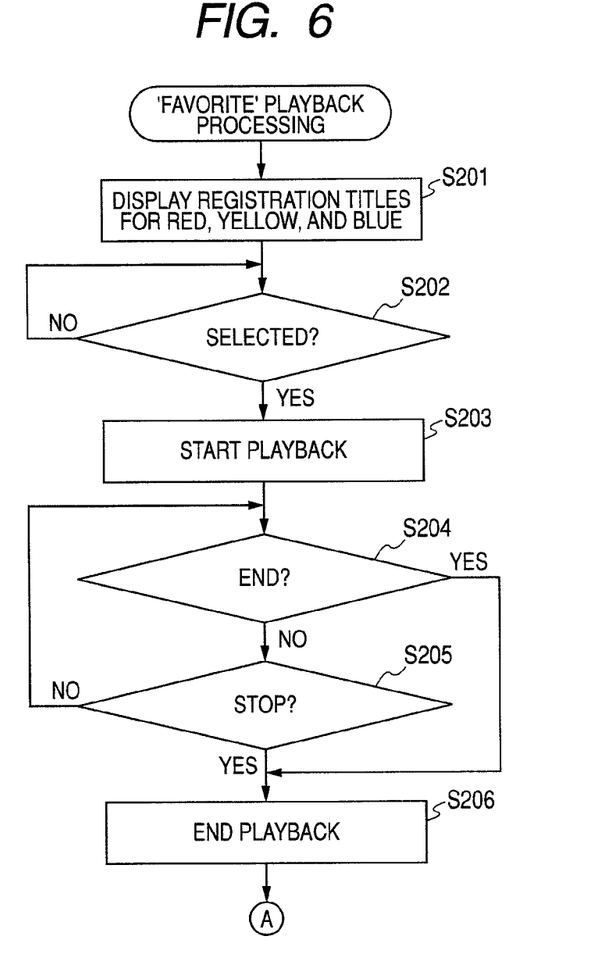
FIG. 6 is a flowchart illustrating the details of a 'FAVORITE' playback processing.

FIG. 6 is a flowchart showing a procedure of a 'FAVORITE' playback processing that is executed when 'FAVORITE' is selected on the main menu screen. First, based on 'MUSIC PIECE ID' for 'RED', 'YELLOW', and 'BLUE' registered in the favorite registration table 74, registration titles for red, yellow, and blue are displayed on the lower image display section 52 (Step S201). Next, it is determined whether or not one of the registration titles displayed for each of red, yellow, and blue is selected by pen-touching (Step S202). If one registration title is selected, 'SOUND SOURCE DATA (ENTIRE)' corresponding to 'MUSIC PIECE ID' of the selected registration title is sequentially read out from the sound source data table 73 and starts to be played back (Step S203).

Next, it is determined whether or not 'SOUND SOURCE DATA (ENTIRE)' is read out and the playback of the corresponding music piece ends (Step S204). When the playback of the music piece does not end, it is determined whether or not a playback stop instruction is input by key operation of the player (Step S205). The playback is continued until the playback of the music piece ends or the playback stop instruction is input, and the playback ends when the playback of the music piece ends or the playback stop instruction is input (Step S6).

Accordingly, as described above, the player can enjoy the favorite music pieces corresponding to red, yellow, and blue according to his/her mental state by selecting 'FAVORITE' playback on the menu screen.

Figure 7:
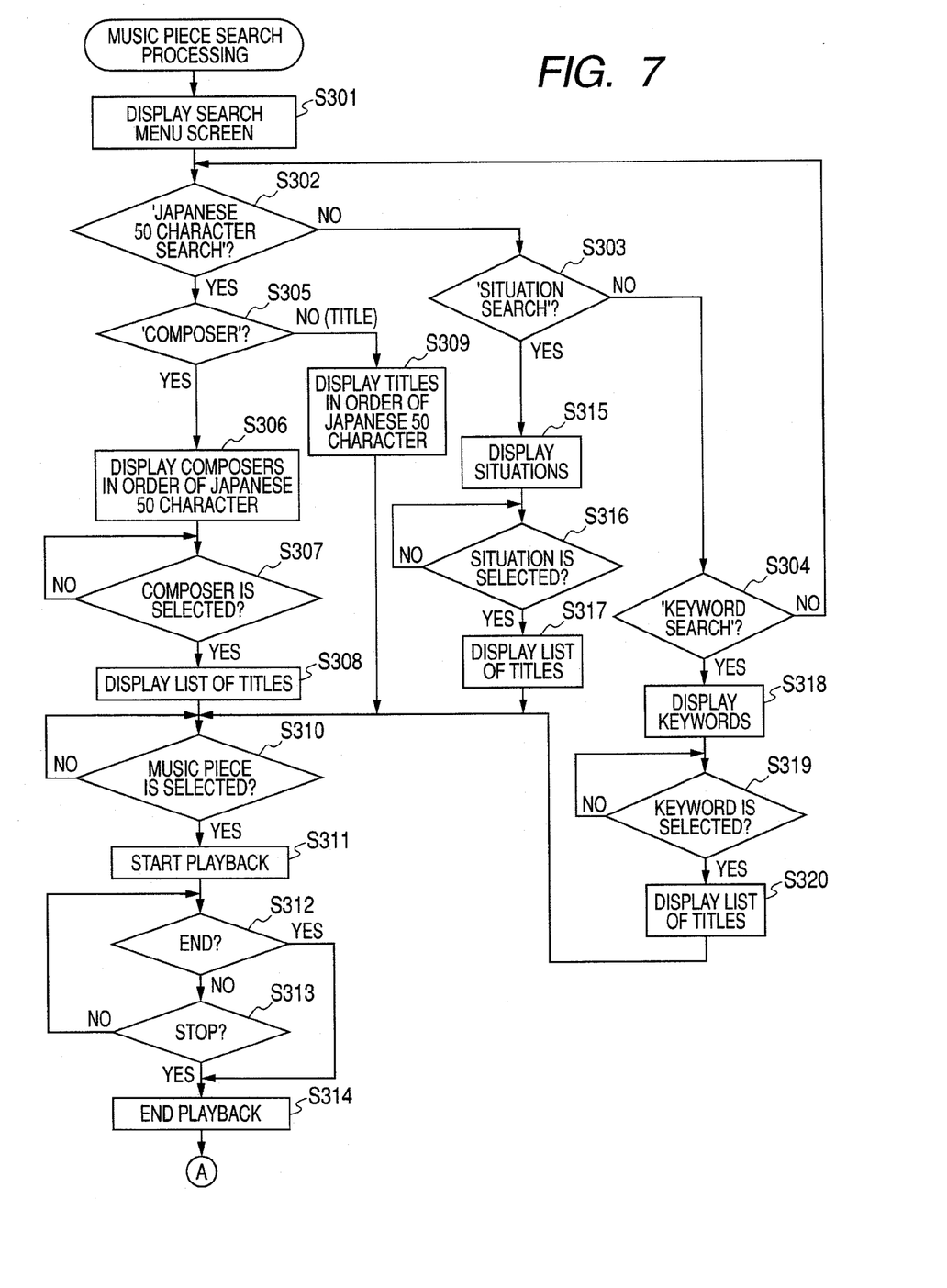
FIG. 7 is a flowchart illustrating the details of a music piece search processing.

FIG. 7 is a flowchart showing a procedure of a music piece search processing that is executed when 'SEARCH MUSIC PIECE' is selected on the main menu screen. First, a search menu screen is displayed on the lower image display section 52 (Step S301). In this embodiment, the search menu screen includes selection tools, such as 'JAPANESE 50 CHARACTER SEARCH', 'SITUATION SEARCH', and 'KEYWORD SEARCH'. It is determined whether or not one of the selection tools, that is, 'JAPANESE 50 CHARACTER SEARCH' (Step S302), 'SITUATION SEARCH' (Step S303), AND 'KEYWORD SEARCH' (Step S304) is selected by pen-touching.

If 'JAPANESE 50 CHARACTER SEARCH' is selected (Step S302; YES), a selection screen having 'COMPOSER' and 'TITLE' is displayed, and it is determined whether or not 'COMPOSER' is selected (Step S305). If 'COMPOSER' is selected, the composers are read out from the composer data table and displayed in the order of the Japanese 50 character (Step S306). Next, it is determined whether or not one composer is selected from the composers displayed in the order of the Japanese 50 character (Step S307). If the composer is selected, a list of titles of the music pieces of the composer is displayed (Step S308). The list is displayed by extracting 'TITLE' of the selected composer with reference to 'COMPOSER' in the music piece data table 71.

When it is determined NO in Step S305 and the title is selected, the titles are displayed in the order of the Japanese 50 character (Step S309). Then, it is determined whether or not one title is selected from the titles in the order of the Japanese 50 character in Step S309 or the list of titles in the Step S308 (Step S310). When one title is selected, 'SOUND SOURCE DATA (ENTIRE)' corresponding to the 'MUSIC PIECE ID' of the selected title is sequentially read out from the sound source data table 73 and starts to be played back (Step S311).

Next, it is determined whether or not 'SOUND SOURCE DATA (ENTIRE)' is read out and the playback of the corresponding music piece ends (Step S312). When the playback of the music piece does not end, it is determined whether or not the playback stop instruction is input by key operation of the player (Step S313). The playback is continued until the playback of the music piece ends or the playback stop instruction is input, and the playback ends when the playback of the music piece ends or the playback stop instruction is input (Step S314).

Therefore, when the player knows the title of a music piece he/she wants to hear, he/she can enjoy the music piece any time.

Meanwhile, if 'SITUATION SEARCH' is selected on the search menu screen, it is determined YES in Step S303. Then, the process progresses to Step S315 from Step S303, and a situation is displayed (Step S315). When a situation is displayed, a situation for each music piece, such as 'MORNING', 'RAINY DAY', 'YEAR-END', or the like, in 'SITUATION' of the music piece data table 71 is extracted and displayed. When the same situation is stored for different music pieces, different situations only are displayed without repeatedly displaying the same situation.

Accordingly, a plurality of different situations are displayed on the lower image display section 52. Next, it is determined whether or not one situation is selected from the plurality of different situations (Step S316). If a situation is selected, a list of titles based on the selected situation is displayed (Step S317). The list is displayed by extracting 'TITLE' based on the selected 'TITLE' with reference to 'SITUATION' in the music piece data table 71.

Thereafter, the processing after Step S310 is executed. In this embodiment, accordingly, even if a title or a plurality of titles correspond to 'SITUATION', a list is first displayed (Step S317), and when a music piece is selected from the list, playback starts. However, when a title corresponds to 'SITUATION', list display and music piece selection may not be performed, that is, Steps S317 and S310 may not be performed, and the process may progress to Step S311 to immediately start the playback. Accordingly, the player can hear a music piece conforming to a selected situation.

If 'KEYWORD SEARCH' is selected on the search menu screen, it is determined YES in Step S304. Accordingly, the process progresses to Step S318 from Step S304, a keyword is displayed (Step S318). When a keyword is displayed, a keyword for each music piece, such as 'SOLEMN', 'UPLIFTED', or the like, in the 'KEYWORD 1', 'KEYWORD 2', ... of the music piece data table 71 is extracted and displayed. When the same keyword is stored for different music pieces, different keywords only are displayed, without repeatedly displaying the same keyword.

Accordingly, a plurality of different keywords are displayed on the lower image display section 52. Next, it is determined whether or not a keyword is selected from the plurality of different keywords (Step S319). If a keyword is selected, a list of titles based on the selected keyword is displayed (Step S320). The list is displayed by extracting 'TITLE' based on the selected keyword with reference to 'KEYWORD' of the music piece data table 71.

Thereafter, the above-described processing after Step S310 is executed. In this embodiment, accordingly, even if a music piece or a plurality of music pieces correspond to 'KEYWORD', a list is first displayed (Step S320), and when a music piece is selected from the list, playback starts. However, when a music piece corresponds to 'KEYWORD', list display and music piece selection may not be performed, that is, Steps S320 and S310 may not be performed, and the process may progress to Step S311 to immediately start the playback.

In this embodiment, situations or keywords are displayed for selection. Alternatively, the player may manually input a situation or a keyword with the touch pen 41. Then, music pieces corresponding to the input situation or keyword may be extracted and listed or played back without being listed.

Figure 8:
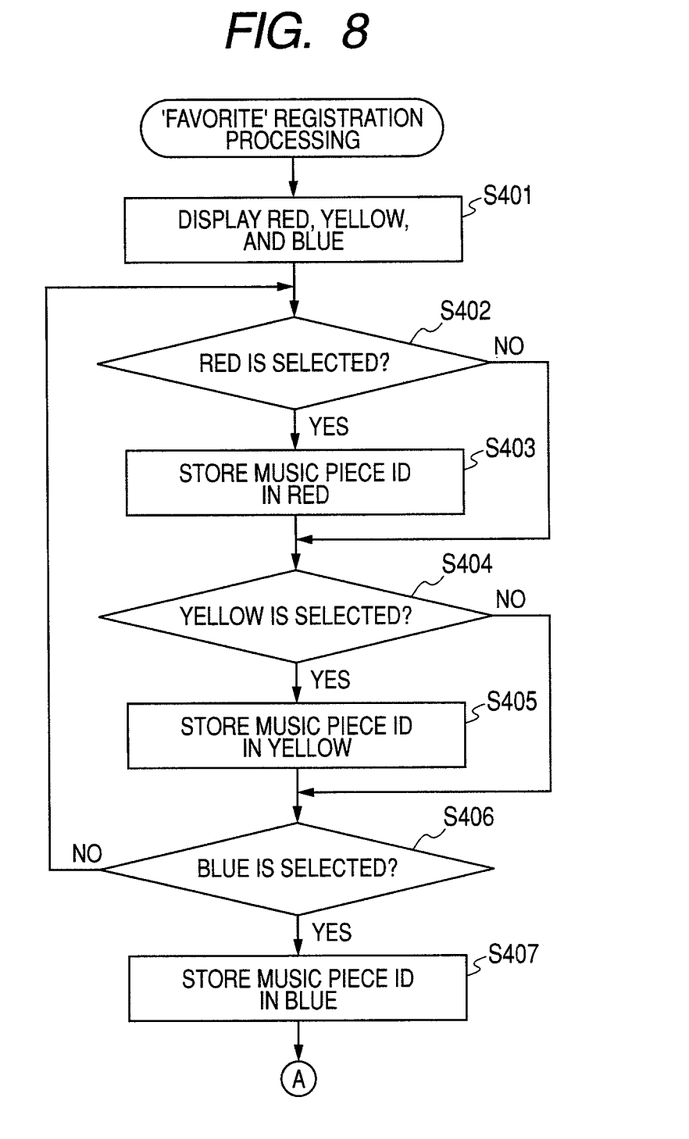
FIG. 8 is a flowchart illustrating the details of a favorite addition processing.

FIG. 8 is a flowchart showing a procedure of a favorite registration processing (Step S12). First, red, yellow, and blue buttons are displayed on the lower image display section 52 (Step S401). Next, it is determined whether or not one button is selected from the red button (Step S402), the yellow button (Step S404), and the blue button (Step S406). When the red button is selected (Step S402; YES), the music piece ID of a music piece, which is being currently played back in a random manner, based on the title displayed in the first window 54 is stored in 'RED' of the favorite registration table 74 (Step S403).

When the yellow button is selected (Step S404; YES), the music piece ID of the music piece is stored in 'YELLOW' in the favorite registration table 74 (Step S405). In addition, when the blue button is selected (Step S406; YES), the music piece ID of the music piece is stored in 'BLUE' of the favorite registration table 74 (Step S407).

Accordingly, the player can passively hear a music piece to be randomly played back, and when a red, yellow, or blue image from the music pieces is generated, can instantly register the music piece as the 'FAVORITE'.

Though not shown, the details of 'FAVORITE' may be subject to an edition processing, in addition to the addition processing. In the edition processing, for example, music piece data registered as the favorite may be deleted or may be moved among 'RED', 'BLUE', and 'YELLOW'.

In this embodiment, the video game apparatus main body 10 and the display device 50 are constituted as a single body. Alternatively, the video game apparatus main body 10 and the display device 50 may be constituted separately from each other, and the display device 50 may include image display sections, in addition to the upper and lower image display sections 51 and 52. In addition, the display device 50 may be divided into a plurality of display regions. In this case, the same advantages and effects can also be obtained.

The embodiment has been described by way of the video game apparatus 100, but the invention may be applied to various apparatuses, such as a personal computer, a cellular phone, a portable game machine, and the like, insofar as they have an image generation function.

Although game data that causes the video game apparatus main body 10 to execute the above-described processing (various kinds of data, such as control programs and the like, used for the games) is stored in the recording medium 70, the game data may be distributed from a server apparatus, such as a WWW server or the like. In this case, the vide game apparatus main body 10 may acquire the game data to be distributed from the server apparatus through a communication network, store the acquired game data in the HDD 13, and load the game data from the HDD 13 onto the RAM 12.

Although the invention has been described with reference to several exemplary embodiments, it is understood that the words that have been used are words of description and illustration, rather than words of limitation. Changes may be made within the purview of appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A non-transitory program recording medium that is readable by a computer included in a player body, which includes a display and a player for playing back music, the program recording medium comprising:
   a sound source data storage that stores sound source data of a plurality of music pieces, which are playable by the player; and
   an associated information storage that stores associated information in association with each of the plurality of music pieces,
   wherein the program recording medium includes a program which causes the computer to execute:
      selecting partial sound source data of one of the plurality of music pieces from the sound source data storage;
      playing the partial sound source data with the player;
      when the partial sound source data of the one of the plurality of music pieces is played, detecting a presence/absence of a given operation; and
      when the given operation is detected in the detecting the presence/absence of the given operation, reading the associated information associated with the one of the plurality of music pieces, which is played by the player, from the associated information storage, and displaying the read associated information on the display,
      wherein the partial sound source data is a portion of the sound source data of the one of the plurality of music pieces.

2. The program recording medium according to claim 1, wherein the program causes the computer to further execute:
   in the playing the partial sound source data, one of randomly and sequentially playing parts of the one of the plurality of music pieces.

3. The program recording medium according to claim 1, wherein the sound source data storage stores a plurality of partial sound source data for each of the plurality of music pieces which allows part of each of the plurality of music pieces to be played by the player, and
   the program causes the computer to further execute:
      in the selecting the partial sound source data, randomly selecting the partial sound source data from among the plurality of partial sound source data of the one of the plurality of music pieces from the sound source data storage.

4. The program recording medium according to claim 3, further comprising:
   an entire sound source data storage that, for each of the plurality of music pieces corresponding to the plurality of partial sound source data stored in the sound source data storage, stores entire sound source data for entirely playing each of the plurality of music pieces.

5. The program recording medium according to claim 1, wherein the associated information stored in the associated information storage includes at least a title, explanation data, and an associated image of the one of the plurality of music pieces.

6. The program recording medium according to claim 1, wherein the associated information storage stores a plurality of kinds of associated information in association with each of the plurality of music pieces, and
   the displaying the read associated information includes;
      when the given operation is detected in the detecting the presence/absence of the given operation, reading first associated information from the associated information storage and displaying the first associated information on the display, and
      after the displaying the first associated information, in response to a second operation, sequentially reading additional associated information from the associated information storage and displaying the additional associated information on the display.

7. The program recording medium according to claim 6, wherein the plurality of kinds of associated information include information indicative of an additional recording medium on which a corresponding music piece is recorded.

8. The program recording medium according to claim 1, further comprising:
   a writable storage area,
   wherein the program further causes the computer to execute:
      writing music piece information indicative of the one of the plurality of the music pieces, which is played, into the storage area according to a write request based on an operation.

9. The program recording medium according to claim 8, wherein the program further causes the computer to execute;
   selecting one music piece information from among the music piece information written into the storage area in the writing the music piece information according to a second operation, and
   reading entire sound source data of a music piece identified by the one music piece information selected in the selecting the one music piece information from an entire sound source data storage and playing the read entire sound source data with the player.

10. The program recording medium according to claim 1, wherein the program recording medium is a semiconductor memory.

11. The program recording medium according to claim 1, wherein the program recording medium is a recording medium exclusively for a portable video game machine.

12. A playback device, comprising:
    a display;
    a player that plays music;
    a sound source data storage that stores sound source data of a plurality of music pieces, which are playable by the player;
    an associated information storage that stores associated information in association with each of the plurality of music pieces;
    a playback processor that selects partial sound source data of one of the plurality of music pieces from the sound source data storage unit and causes the player to play the partial sound source data;

a detector that, when the partial sound source data is played by the player, detects a presence/absence of a given operation; and a display processor that, when the given operation is detected by the detector, reads the associated information associated with the one of the plurality of music pieces, which is played by the player, from the associated information storage and causes the display to display the read associated information, wherein the partial sound source data is a portion of the sound source data of the one of the plurality of music pieces.

13. A playback control method of a player body, wherein the player body includes a display, a player that plays music, a sound source data storage that stores sound source data of a plurality of music pieces, which are playable by the player, and an associated information storage that stores associated information in association with each of the plurality of music pieces, and the playback control method comprises:

selecting partial sound source data of one of the plurality of music pieces from the sound source data storage;

causing the player to play the partial sound source data;

when the partial sound source data is played, detecting a presence/absence of a given operation; and when the given operation is detected in the detecting the presence/absence of the given operation, reading the associated information to associated with the one of the plurality of music pieces, which is played by the player, from the associated information storage and causing the display to display the read associated information, wherein the partial sound source data is a portion of the sound source data of the one of the plurality of music pieces.

14. The program recording medium according to claim 1, wherein the partial sound source data is one of an introduction and a refrain of the sound source data of the one of the plurality of music pieces.

15. The program recording medium according to claim 1, wherein the program further causes the computer to execute, when the partial sound source data of the one of the plurality of music pieces is played, in response to a predetermined period of time lapsing, randomly selecting partial sound source data of a different one of the plurality of music pieces from the sound source data storage and playing the partial sound source data of the different one of the plurality of music pieces with the player.

16. The playback device according to claim 12, wherein the partial sound source data is one of an introduction and a refrain of the sound source data of the one of the plurality of music pieces.

17. The playback device according to claim 12, wherein, when the playback processor causes the player to play the partial sound source data of the one of the plurality of music pieces, in response to a predetermined period of time lapsing, the playback processor randomly selects partial sound source data of a different one of the plurality of music pieces from the sound source data storage and causes the player to play the partial sound source data of the different one of the plurality of music pieces.

18. The playback control method according to claim 13, wherein the partial sound source data is one of an introduction and a refrain of the sound source data of the one of the plurality of music pieces.

19. The playback control method according to claim 13, further comprising, when the partial sound source data of the one of the plurality of music pieces is played, in response to a predetermined period of time lapsing, randomly selecting partial sound source data of a different one of the plurality of music pieces from the sound source data storage and playing the partial sound source data of the different one of the plurality of music pieces with the player.

* * * * *

UNITED STATES PATENT AND TRADEMARK OFFICE
CERTIFICATE OF CORRECTION

| | | |
|---|---|---|
| PATENT NO. | : 7,947,890 B2 | Page 1 of 1 |
| APPLICATION NO. | : 12/132827 | |
| DATED | : May 24, 2011 | |
| INVENTOR(S) | : Takashi Orikata | |

It is certified that error appears in the above-identified patent and that said Letters Patent is hereby corrected as shown below:

At column 5, line 37, please change "9D" to --9E--.

Signed and Sealed this
Sixth Day of September, 2011

David J. Kappos
*Director of the United States Patent and Trademark Office*